May 12, 1964 E. L. FROST 3,133,255

VOLTAGE TUNED SEMICONDUCTOR VARIABLE FREQUENCY OSCILLATOR

Filed July 3, 1961

INVENTOR,
EMERSON L. FROST

BY Jack H. Linscott

ATTORNEY.

3,133,255
Patented May 12, 1964

3,133,255

VOLTAGE TUNED SEMICONDUCTOR VARIABLE FREQUENCY OSCILLATOR

Emerson L. Frost, 53 Parker Ave., Manasquan, N.J., assignor to the United States of America as represented by the Secretary of the Army Filed July 3, 1961, Ser. No. 128,621
8 Claims. (Cl. 331—108)
(Granted under Title 35, U.S. Code (1952), sec. 266)

The invention described herein may be manufactured and used by or for the Government for governmental purposes, without the payment of any royalty thereon.

The invention relates to electronic amplifiers and oscillators and particularly to such devices embodying solid state semiconducting materials.

In the broad field of solid state devices including transistors and the like their mode of operation is characterized by specific functions which lend themselves to many valuable applications which are not within the capabilities of vacuum tubes. The present invention makes use of certain of these specialized functions.

In circuit elements such as amplifiers, modulators and oscillators, wherein the semiconductor is provided with a base connection, and emitter and a collector, modulation of the collector current may be effected by injecting carriers of electric charges of a polarity not present in the semiconductor body thru a rectifying contact therewith. If the body is N type material holes are injected into the body by current flowing in the easy flow direction at the emitter. The holes migrate thruout the body due to diffusion and the fields produced by the emitter and collector currents.

As a result of this diffusion a substantial part of the holes flow to the region of the collector where they aid the emission of electrons at that point, thus current multiplications are produced and current gains are realized. In such devices the collector impedance is high relative to the emitter impedance whereby considerable power gain is obtained.

It is known in devices such as those above suggested that there is a finite velocity of travel of the holes along the semiconductor between the emitter and collector contact points and that this velocity can be controlled by the application of an electric field to the semiconductor body along the direction of flow of holes. Moreover the drift time factor between contact points upon the semiconductor body is inversely proportional to the voltage of the applied field.

The above properties of semiconductors are used in the present invention to provide a novel device wherein oscillatin may be sustained to provide useful power and wherein the output frequency may be voltage tuned.

Briefly the invention consists of an elongated body of semiconductor material having ohmic terminals at its extremities to which are connected a variable power source such as a battery for applying a field to the semiconductor. An emitter member is arranged to contact the semiconductor near one of its ends and a collector contacts the semiconductor at a point remote from the emitter toward its other end. A bias battery is connected between the adjacent ohmic contact and the emitter to provide a forward flow from the emitter to the semiconductor and another battery is connected to bias the collector in a reverse flow direction.

A transformer or other coupling device is connected between the emitter and collector acting to feed back current developed at the collector to the emitter. The feedback coupling device is so constructed that the feed back current component will have zero phase angle with respect to the signal applied to the emitter. A regeneration effect is thus achieved and sustained oscillation with power gain may be taken from the collector circuit.

The frequency of the output is a function of the transit time of the carriers thru the semiconductor from the emitter to the collector. Thus frequency may be adjusted by varying the field strength of the applied field or the space between the emitter and the collector or by varying both of these factors. A detailed description of the invention and its operation will be presented hereinafter.

A general object of the invention is to provide an improved electronically tunable oscillator.

A further object of the invention is to provide an oscillator which utilizes controllable transit time characteristics of semiconductor materials to tune the output frequency thereof.

A further object of the invention is to provide a solid state tunable oscillator wherein a portion of the output thereof is fed back to the input.

A further object of the invention is to provide an oscillator which requires no cathode heater current.

A further object of the invention is to provide an efficient variable frequency oscillator of minimum size and weight for use in miniaturized systems.

Other objects and features of the invention will more fully appear from the following detail description and will be particularly pointed out in the claims.

To provide a better understanding of the invention particular embodiments thereof will be described and illustrated in the accompanying drawings wherein.

Figure 1:
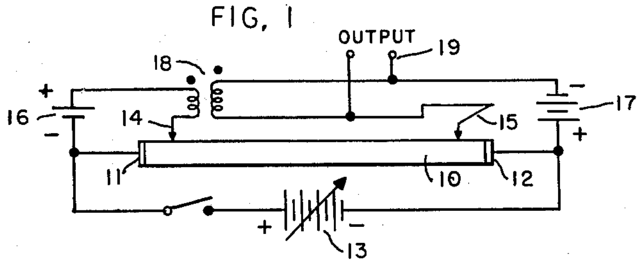
FIGURE 1 is a diagrammatic view of an oscillator embodying the invention.

An example of a suitable form for the invention is shown in FIGURE 1 wherein a semiconductor body 10 is provided with ohmic connections 11 and 12.

A variable voltage supply such as the battery 13 is connected across the terminals 11 and 12 to establish an electric field in the semiconductor 10. The semiconductor is of elongated shape and desirably of small cross sectional dimension and is made of germanium or silicon having a uniform conductivity characteristic thruout its length. It may be of the N type or P type material.

It has been found that the semiconductor may best be of filamentary construction wherein its body portion may be as small as .005 of an inch in cross section. Desirably the end portions are enlarged to provide a substantial area upon which the ohmic contacts 11 and 12 are received. These connections should be non rectifying and may be metallic coatings electroplated upon the end surfaces. This filamentary body is of substantial length. Its length depends upon the parameters of the system in which it is used and may be of the order of one inch long.

The filamentary form of the member 10 insures that the intensity of the electric field applied thereto may be high. Moreover this form of semiconductor also insures that the field will be uniform and the paths of the holes or charges traversing the filament will be substantially rectilinear.

A contact is established near one end of the semiconductor which may be a point contact 14 of tungsten or other suitable material which will function as an emitter. A second point contact 15 is made remote from the emitter and will function as a collector. The emitter 14 is connected to the termimnal 11 thru a biasing source such as the battery 16. The collector 15 is connected to the terminal 12 thru a biasing source such as the battery 17. A transformer 18 is so connected that a portion of the output from the collector 15 will be fed back to the emitter 14. The turns ratio of the transformer 18 is adjusted to provide power gain. A switch S may be inserted in the circuit of the field battery to provide an off control of the device.

With the above described device oscillations are set up and the frequency thereof is inversely proportional to the drift time factor of the holes or charges flowing from the emitter to the collector thru the semiconductor and also to the intensity of the applied electric field. By proper adjustment of the drift space or the applied voltage or adjustment of both a substantial variation in output frequency is obtainable.

When the semiconductor material is germanium of high back voltage N type the polarity of the sources 15, 16, and 17 are as indicated in FIGURE 1. If the body 10 is of P type material the polarities of the sources should be reversed. The bias upon the emitter 14 should be small of the order of .1 volt and that upon the collector of the order of 10 to 100 volts.

It should be pointed out that the rectifying type junction between the emitter 14 and the body 10 may be constructed by forming an integral lateral wing or extension on the body material which must be of the opposite conductivity type. In FIGURE 1 the integral wing would be of P type material. Also the rectifying junction between the collector and the body may be of the integral type.

In operation of the invention the feed back component of current must have zero phase angle with the injected component at the emitter. This circuit relationship is established by the combined effect of the transformer 18 and the other circuit elements which establish 360° of phase shift between the feed back current component and the injected component. Other means for establishing correct feed back phase relationship may be employed as will be pointed out hereinafter. Output current is derived from the collector fed transformer primary circuit and is conducted to the load by the terminals 19.

The successful operation of the device of the invention is based to a large extent upon the flow of holes in the semiconductor and the ability to control the rate of flow of the holes. To clarify the details of operation of the device a more complete statement of the basic function of semiconductor translating devices as they apply to the present invention will now be made. The emitter 14 injects carriers, which in the device above described are holes, into the N type semiconductor 10. The holes flow thru the semiconductor at a rate determined by the carrier drift rate which is determined by the intensity of the field applied by the source 13. The carriers will therefore arrive at the collector 15 at a finite time period after they are injected at the emitter. When this happens a pulse of current is induced in the primary of the transformer 18 as a result of which a pulse is induced in its secondary. Since the secondary is connected to the emitter 14 another cycle is initiated. Thus sustained oscillations are created. Under certain circumstances the collector current may be less than the emitter current. However, power gain may be realized by compensating turns ratios in the transformer.

As above stated output frequency may be varied by varying field intensity and changing the drift space between emitter and collector. In the latter case it should be borne in mind that the drift space cannot be extended beyond the maximum distance traveled during the life of the holes.

Figure 2:
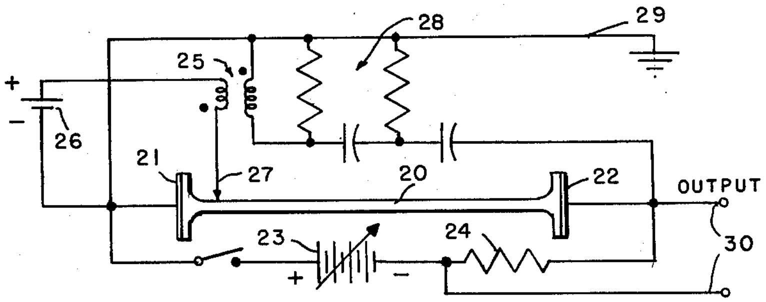
FIGURE 2 is a diagrammatic view of a component similar to that shown in FIGURE 1 illustrating a different circuit arrangement.
Figure 3:
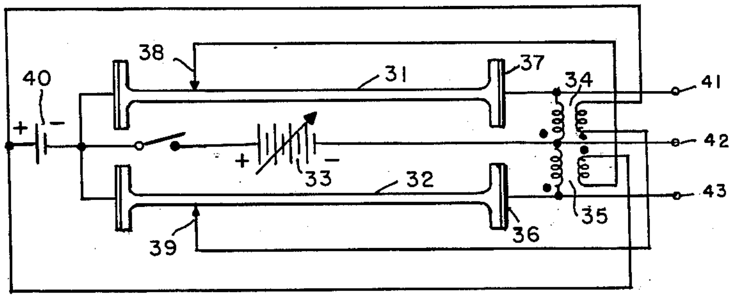
FIGURE 3 is a further example of an oscillator component embodying two semiconductor elements so interconnected as to produce a common output.

Other forms of the invention are shown in FIGURES 2 and 3. In FIGURE 2 a filamentary semiconductor 20 which for example is composed of germanium is provided with ohmic terminals 21 and 22 at its ends to which is connected a variable voltage source 23 having a resistor 24 connected in series therewith. The terminal 21 is connected to one end of the secondary of a transformer 25 thru a bias source 26 the other end of the winding being connected to the emitter 27. The terminal 22 in this case acts as the collector and is connected to a resistance capacity network shown at 28. The resistance capacity network conducts the collector current to the primary winding of the transformer 25 which is connected to the ohmic terminal 21. The common conductor 29 connecting the transformer primary and the resistive elements of the resistance capacity network is grounded.

This device functions in a manner similar to that of the device shown in FIGURE 1. The drift space extends from the emitter 27 along the semiconductor to terminal 22 which is not a rectifying contact. In this case however the required phase shift in the feed back component is realized in the combination of the resistance capacity network which causes a 90° shift and the transformer 25 which causes a 180° shift. These two shifts together with the 90° shift realized along the drift space produces the required condition to attain zero shift at the emitter 27. The output of this oscillator would be taken off at the terminals 30.

FIGURE 3 illustrates the use of two semiconductors 31 and 32 arranged to function as sequential elements. An electric field is applied to both of them by a direct current source 33. As in the prior forms of the invention described above the positive terminal of the field source is connected to the end of the semiconductors 31 and 32 nearest the emitters. The negative source terminal is connected to a terminal common to the primary winding of a pair of transformers 34 and 35. The other ends of the primary winding are connected to the ohmic terminals 36 and 37 of the semiconductors. The emitters 38 and 39 are biased by the source 40. The emitter 38 is connected to the secondary winding of the transformer 35 and the emitter 39 is connected to the secondary of the transformer 34. It should be noted that this circuit is not of the push pull type since the transformers have no mutual coupling.

Each half of this system provides 90° phase shift. The additional 180° phase shift is accomplished by transformer phase inversion. Thus a sustained oscillation is provided the frequency of which may be varied by adjusting the voltage of the source 33 or by shifting the points of contact of the emitters 38 and 39 or by making both adjustments. Power from the apparatus may be conducted to a load in various ways. Three terminals 41, 42 and 43 may be provided. Terminal 42 is connected to the common connection between the transformer primaries. Terminals 41 and 43 are connected to the other terminals of the two primaries. A load may be connected between either pair of terminals, that is between terminals 41 and 42 or 42 and 43. Also the load may be connected at terminals 41 and 43 in which case a higher voltage will be obtained. It should be noted that this system provides for operation in quadrature to provide a rotating field at its output.

What is claimed is:

1. A semiconductor oscillator comprising an elongated semiconductor body, a direct current power source connected to the ends of said semiconductor to establish an electric field therein, an emitter electrode having an easy flow rectifying junction with said semiconductor adjacent an end thereof, a collector element having an electrical contact with said semiconductor remote from said emitter, means for coupling at least a portion of the current from said collector to and in phase with the input signal at said emitter and output connections from the collector circuit connectable to a load.

2. A semiconductor oscillator according to claim 1 and wherein the semiconductor body is filamentary in structure.

3. A semiconductor oscillator comprising an elongated semiconductor body, a direct current power source connected to the ends of said semiconductor with ohmic contacts, an emitter element having rectifying contact with said semiconductor at one end thereof, a connection from said emitter to one of said ohmic end contacts, a biasing source in said connection to promote easy flow of electrons into said semiconductor, a collector element having contact with said semiconductor at a point remote from the emitter contact, a connection from the collector to the other ohmic contact on said semiconductor, a biasing source in said collector circuit connected to produce high impedance at the point of contact of the collector, electromagnetic coupling means having a primary and secondary the primary thereof being connected in the collector circuit and the secondary being connected in the emitter circuit thus to feed back at least a portion of the current from the collector to the emitter and output connections from the collector circuit connectable to a load.

4. A semiconductor oscillator according to claim 3 and wherein the direct current power source is voltage variable whereby the output frequency is variable.

5. A semiconductor oscillator comprising a filamentary type semiconductor having ohmic low resistance terminals at the ends thereof, a variable direct current voltage source connected to said terminals thereby to provide a field of variable intensity in said semiconductor, an emitter contacting said semiconductor electrically biased to provide easy flow conduction at said contact, a collector element contacting said semiconductor at a point remote from said emitter, and biased to provide high impedance from the semiconductor to the collector, output connections from the collector, a transformer connected to feed back a portion of the current from the collector to the emitter at zero phase shift, the turns ratio of said transformer being adjusted to provide power gain at said output connections.

6. A semiconductor oscillator comprising a semiconductor body having ohmic connections at its ends, a variable voltage direct current source connected across said ohmic connections, an emitter element having rectifying contact with said semiconductor adjacent one end thereof, means to bias said emitter to provide easy flow therefrom to said semiconductor, a resistance capacity circuit connected to the ohmic connection at the end of the semiconductor opposite to the biased emitter said ohmic connection acting as a collector, a transformer connected to feed back at least a portion of the collector current to the emitter, and an output connection from the collector to a load whereby the combined phasing effect of the semiconductor, the resistance capacity circuit and the transformer provide zero phase shift at the emitter to promote oscillations.

7. A semiconductor oscillator according to claim 6 and wherein the semiconductor body is filamentary in structure.

8. A semiconductor oscillator comprising a pair of elongated semiconductors having ohmic contacts at their ends, a direct current field power source, a pair of transformers having one terminal of each of their primary windings connected together and to the negative terminal of said field current source, an emitter element for each semiconductor having rectifying contact therewith near one end thereof, connections from the other terminals of said primary windings to said ohmic contacts remote from said emitter contacts, connections from the ohmic contacts adjacent said emitters to the positive terminal of said field current source, connections from one of said emitters to the secondary of the transformer whose primary is connected to the ohmic contact on the other semiconductor, a connection from the other emitter to the secondary of the second transformer, the opposite ends of both transformer secondaries being connected together and connected to said ohmic contacts of the semiconductors adjacent said emitters and a bias voltage source connected in series in the common connection leading to the latter two ohmic connections.

References Cited in the file of this patent

UNITED STATES PATENTS

| | | |
|---|---|---|
| 2,600,500 | Haynes et al. | June 17, 1952 |
| 2,701,302 | Giacoletto | Feb. 1, 1955 |
| 2,761,020 | Shockley | Aug. 28, 1956 |
| 2,849,615 | Gustafson | Aug. 26, 1958 |